United States Patent [19]
Portman

[11] Patent Number: 5,548,356
[45] Date of Patent: Aug. 20, 1996

[54] AUTOMATIC VIDEO PROJECTION SCREEN

[75] Inventor: John R. Portman, Anahiem, Calif.

[73] Assignees: Sony Corporation, Tokyo, Japan; Sony Transcom, Inc., Irvine, Calif.

[21] Appl. No.: 539,132

[22] Filed: Oct. 4, 1995

[51] Int. Cl.$^6$ ................................................ G03B 21/00
[52] U.S. Cl. ............................................. 353/13; 359/443
[58] Field of Search .............................. 353/12, 13, 122, 353/119; 359/443, 449; 248/917, 919, 920

[56] References Cited

U.S. PATENT DOCUMENTS

| | | | |
|---|---|---|---|
| 1,218,979 | 3/1917 | Cahill | 353/28 |
| 1,864,946 | 6/1932 | Schrago | 359/446 |
| 2,491,184 | 12/1949 | Joss | 353/28 |
| 3,198,066 | 8/1965 | McGhee | 353/28 |

FOREIGN PATENT DOCUMENTS 62-30472  8/1994  Japan .................................. 359/443

OTHER PUBLICATIONS

Panasonic Panaboard, Electronic Print Board, Operating Guide, KX–B555E, Panasonic Communications & Systems Company, Secaucus, New Jersey.
Itoh Power Moller®, KYC Machine Industry Co., Ltd., Interroll Corporation, Happauge, New York.
Honeywell Optoelectronics Data Book, Ussery Printing Co., Inc., Dallas, Texas, p. i, p. iii, p. viii, p. x, and p. 37.

*Primary Examiner*—William Dowling
*Attorney, Agent, or Firm*—Pasquale Musacchio; Jerry A. Miller

[57] ABSTRACT

A screen for an aircraft video projection system. The screen includes a frame for attachment to an aircraft cabin surface and cylindrically shaped first and second pulleys rotatably mounted to the frame. In addition, the first and second pulleys are oriented substantially parallel relative to each other and the first pulley includes an interior hollow. The screen further includes a belt having a viewing surface and an indexing hole adjacent to the viewing surface. The belt is positioned in contact around the first and second pulleys and is moveable between a viewing position in which the viewing surface is exposed for display of the projected image and a stored position in which the viewing surface is hidden. The belt also serves as a heat absorbing layer. A light sensor is positioned opposite the belt. The light sensor serves to detect the presence of the indexing hole. In particular, if the indexing hole is positioned opposite the sensor, the sensor indicates that the viewing surface is exposed. Further, if the indexing hole is not positioned opposite the indexing hole, the sensor indicates that the viewing surface is hidden. In addition, the screen includes a gearmotor affixed within the hollow. The gearmotor serves to rotate the first pulley to move the belt to the viewing position upon detection that the viewing surface is hidden, wherein the gearmotor is affixed within the hollow.

19 Claims, 6 Drawing Sheets

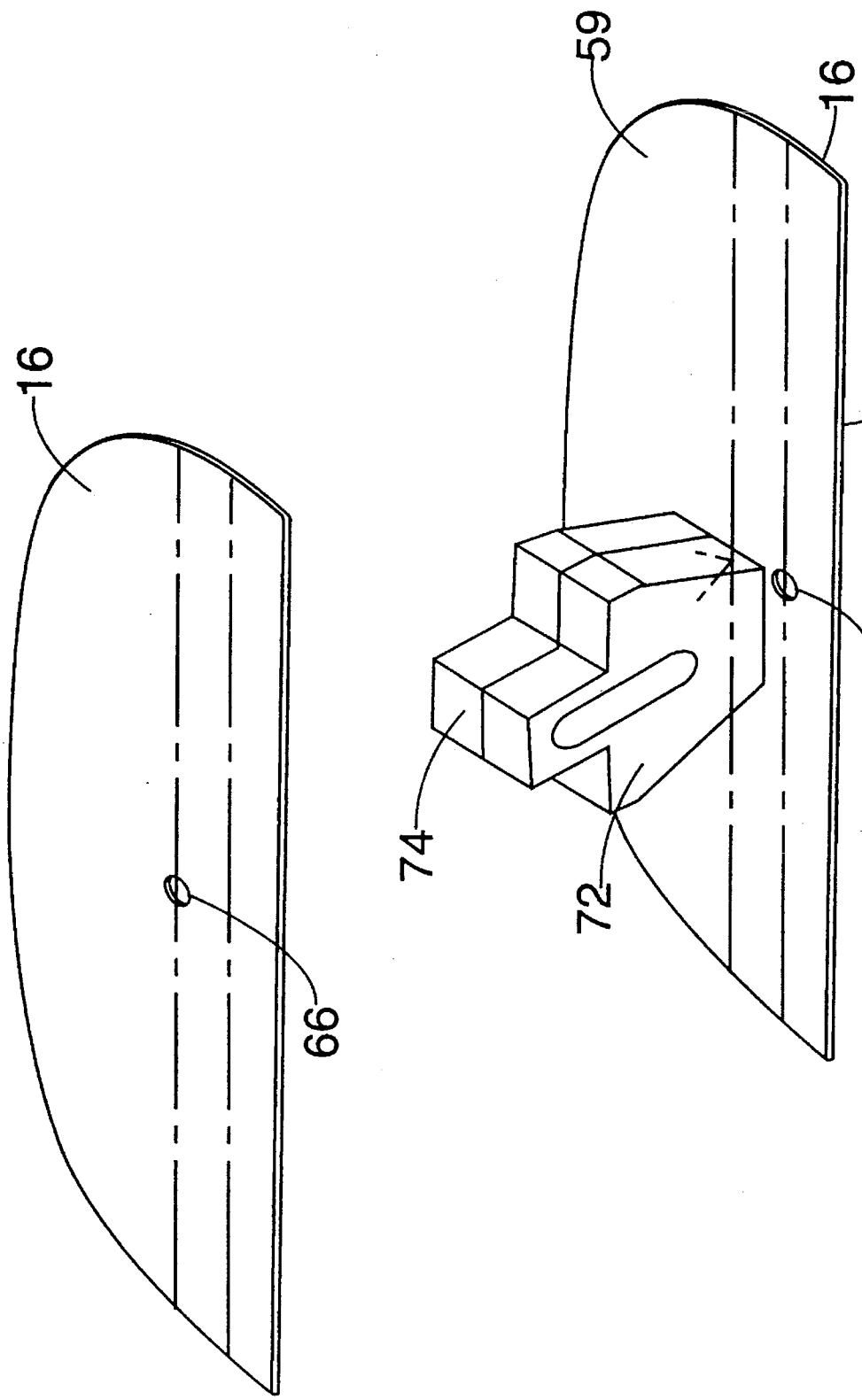

AUTOMATIC VIDEO PROJECTION SCREEN

FIELD OF THE INVENTION

This invention relates to a video projection system for an aircraft cabin, and more particularly, to a video projection screen device which is automatically driven between a viewing position and a stored position upon activation and deactivation, respectively, of the video projection system.

BACKGROUND OF THE INVENTION

The cabin of a commercial aircraft typically includes video equipment for entertaining passengers during a flight. This includes equipment such as a video projection system having a screen for showing a motion picture. In order to operate this equipment, a flight attendant or other airline personnel turns on the system, and further, moves the screen to a viewing position to show the motion picture. When viewing of the motion picture is completed, the flight attendant then turns off the system, and further, moves the screen to a stored position. However, airline personnel typically have numerous tasks which must be completed during the course of a flight. Therefore, it is desirable that the amount of time and effort spent to operate the system be reduced. In addition, access to the system and screen is hindered due to limited space within the cabin, thus increasing the time and effort spent in operating the system.

Electronic blackboard-type devices are known which include a moveable work surface which is used to write or draw on with a writing implement. One such device is known as the Panaboard™ Electronic Print Board, Model No. KX-B555E, and is manufactured by Panasonic. In this device, the work surface is part of a belt, and the belt is driven to either expose or hide the work surface. Further, the belt resides within a frame that is supported by a stand having controls for operating the device. As such, this device is relatively large in size and thus is not adapted for use in a video projection system for the cabin of a commercial aircraft. In addition, airline personnel must still expend time and effort to activate the controls.

Therefore, it is an object of the present invention to provide a video projection screen device which decreases the amount of time and effort spent in operating an aircraft video projection system. It is a further object of the present invention to provide a video projection screen device which is automatically driven between a viewing position and a stored position upon activation of an associated video projection system.

SUMMARY OF THE INVENTION

A screen for an aircraft video projection system in which the system generates a projected image. In particular, the screen includes a frame for attachment to an aircraft cabin surface. The screen further includes first and second pulleys rotatably mounted to the frame and oriented substantially parallel relative to each other. In addition, the first and second pulleys each have a cylindrical shape and both pulleys include an interior hollow for weight savings.

The screen further includes a belt having a viewing surface and an indexing hole adjacent to the viewing surface. The belt is positioned in contact around the first and second pulleys and is moveable between a viewing position in which the viewing surface is exposed for display of the projected image and a stored position in which the viewing surface is hidden. Preferably, the belt is fabricated from a heat absorbing material. A light sensor is positioned opposite the belt. The light sensor serves to detect the presence of the indexing hole. In particular, if the indexing hole is positioned opposite the sensor, the sensor indicates that the viewing surface is exposed. Further, if the indexing hole is not positioned opposite the indexing hole, the sensor indicates that the viewing surface is hidden.

In addition, the screen includes a gearmotor affixed within the hollow of the first pulley. The gearmotor serves to rotate the first pulley to move the belt to the viewing position upon detection that the viewing surface is hidden, wherein the gearmotor is affixed within the hollow.

BRIEF DESCRIPTION OF THE DRAWINGS

FIG. 6 is an enlarged view of balloon section 6 of FIG. 5 which shows light sensors and the indexing holes.

DETAILED DESCRIPTION OF THE INVENTION

Figure 1:
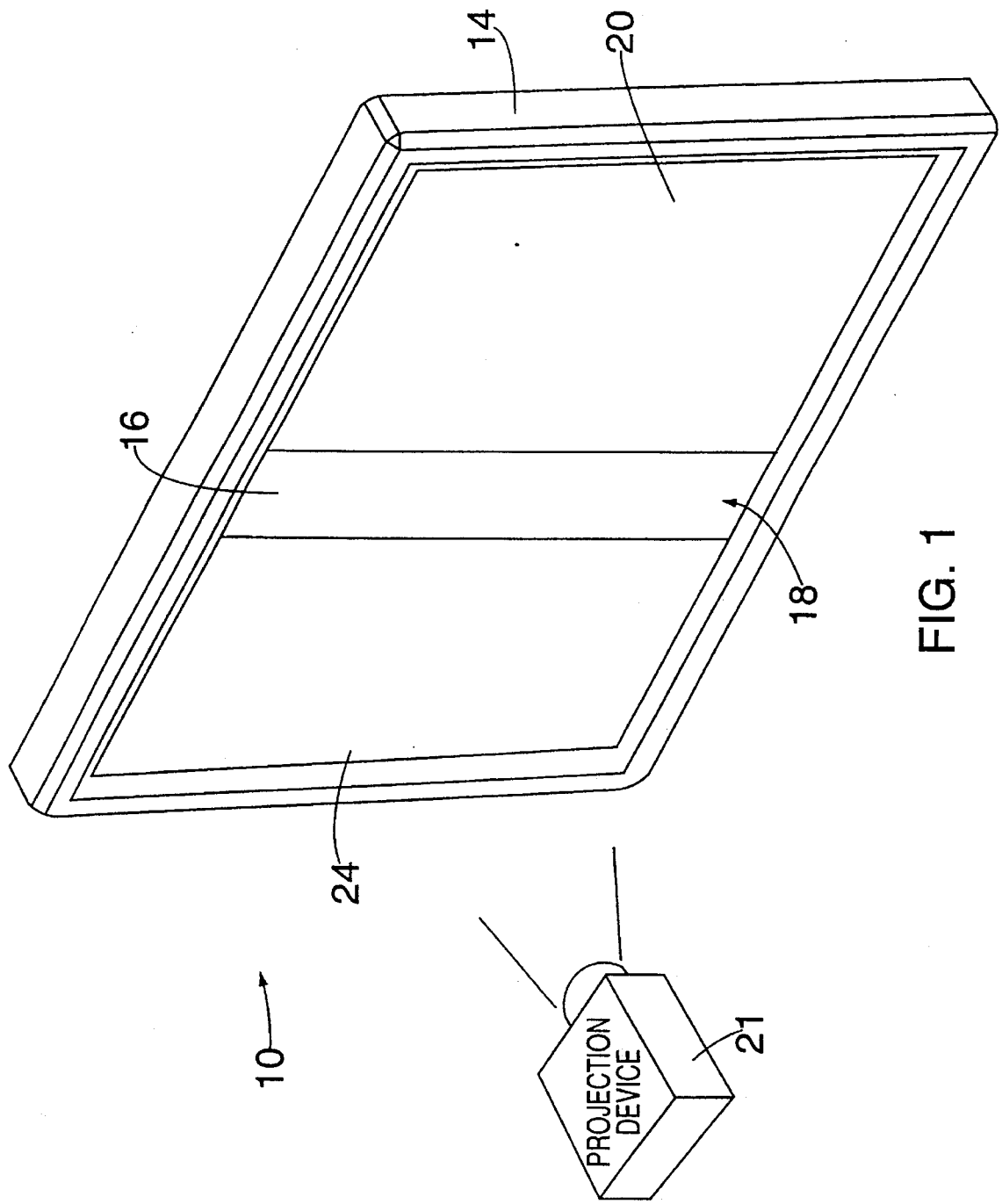
FIG. 1 is a view of an automatic video projection screen device in accordance with the present invention.

The present invention will now be described by referring to FIGS. 1–6, wherein like elements are referenced by like reference numerals.

Referring to FIG. 1, an automatic video projection screen device 10 in accordance with the present invention is shown. In use, the device 10 is affixed to a bulkhead area of an aircraft cabin or other similar area. The device 10 includes a bezel 14 which surrounds a belt 16 having a top surface 18. The top surface 18 includes a screen element 20 which serves as a viewing surface for an aircraft video projection system having a projection device 21. The top surface 18 further includes a decorative element 24 for providing an aesthetically pleasing environment within the cabin of the aircraft. In a viewing position, the belt 16 is positioned such that the screen element 20 is exposed by the bezel 14 and the decorative element 24 is concealed. Conversely, in a stored position, the belt 16 is positioned such that the decorative element 24 is exposed by the bezel 14 and the screen element 20 is concealed. In FIG. 1, the belt 16 is shown positioned between the viewing and stored positions for purposes of illustration. The screen 20 and decorative 24 elements may be bonded onto the top surface 18. In a preferred embodiment, the belt 16 is approximately 91 in. long, 32 in wide and is fabricated from a flexible material such as a thin sheet of stainless steel having a thickness of approximately 0.005 in. In accordance with the present invention, the belt 16 also serves as a heat absorption layer as required by Federal Aviation Administration (FAA) regulations. Therefore, it is noted that other materials having suitable heat absorption properties, such as other metals, may be utilized.

Figure 2:
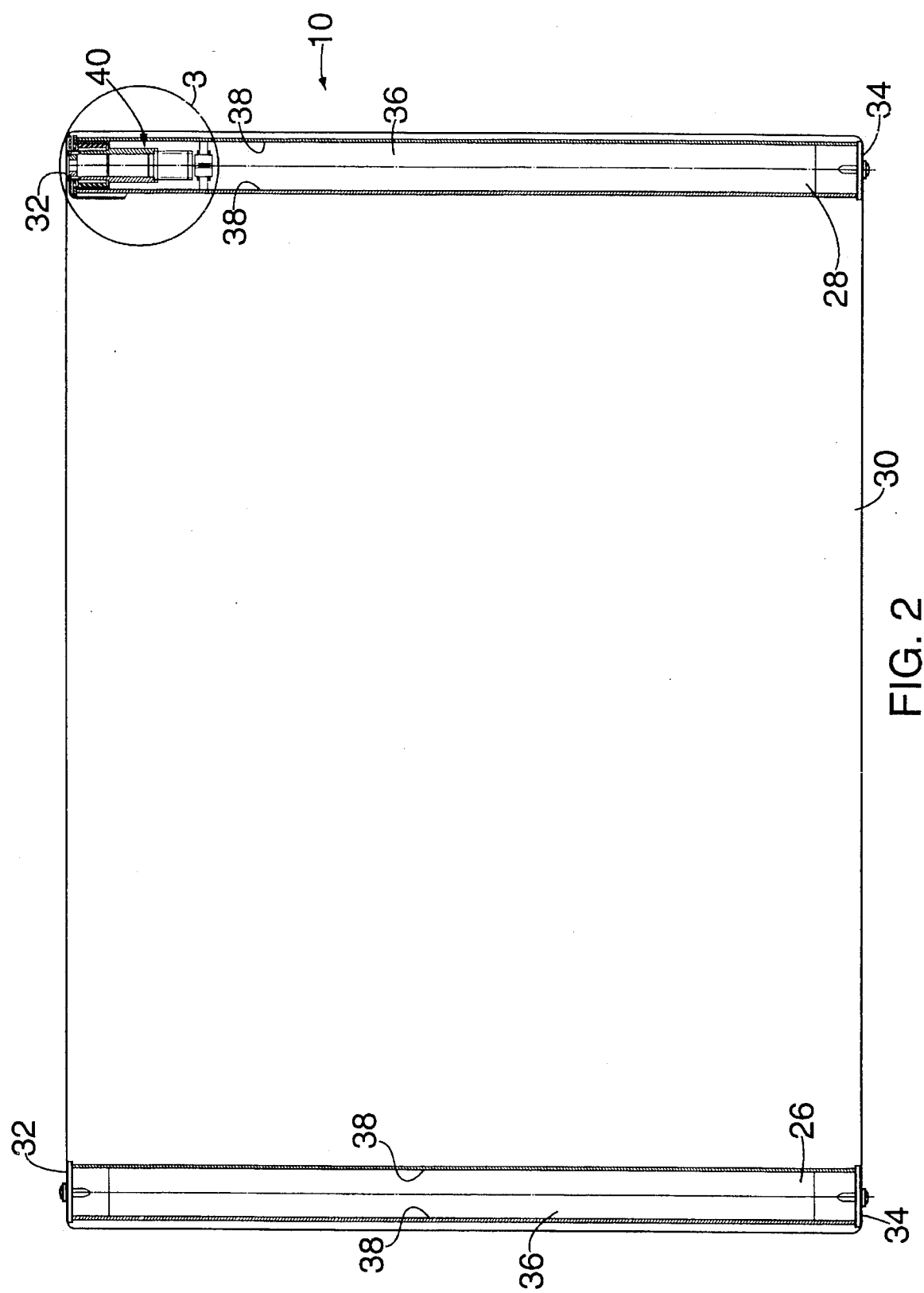
FIG. 2 is a partial cross sectional view of the device with belt and bezel removed.

Referring to FIG. 2, a partial cross sectional view of the device 10 with the bezel 14 and belt 16 removed is shown. The device 10 includes cylindrically shaped idler 26 and drive 28 pulleys which are oriented parallel relative to each other. The idler 26 and drive 28 pulleys are rotatably affixed to a rectangular frame 30 by mounting flanges (not shown). In addition, the idler 26 and drive 28 pulleys each include a top 32 and a bottom 34 end and an interior hollow 36 which defines an inner wall 38 and also serves to save weight. A gearmotor drive assembly 40 is located within the hollow 36 of the drive pulley 28 near the top end 32. The drive assembly 40 serves to rotate the drive pulley 28 to ultimately enable movement of the belt 16 between the viewing and stored positions. In addition, the device 10 includes a parallelism mechanism (not shown) for maintaining the idler 26 and drive 28 pulleys parallel relative to each other.

Figure 3:
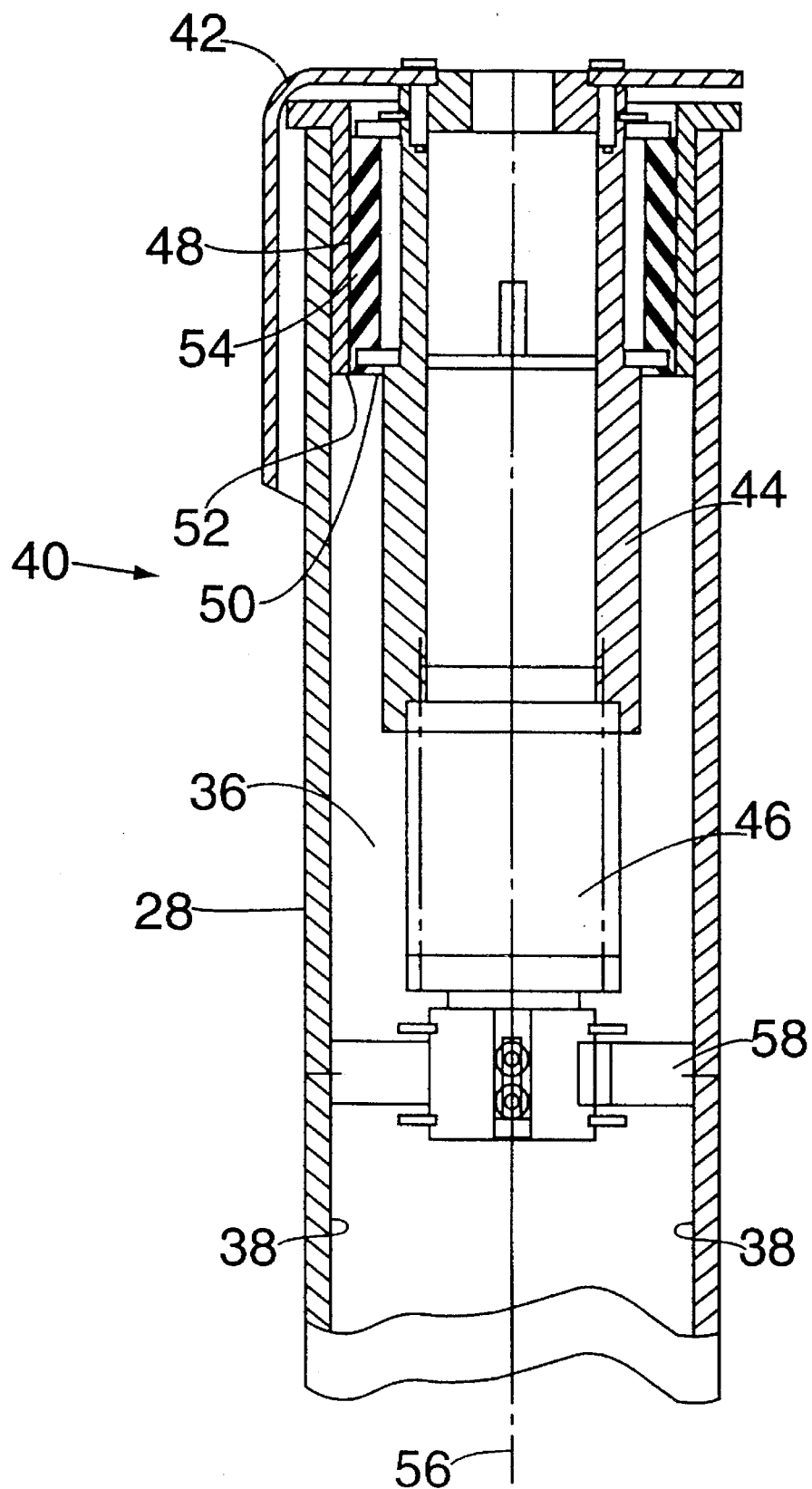
FIG. 3 is an enlarged view of balloon section 3 of FIG. 2 which shows a gearmotor drive assembly for rotating a first pulley.

Referring to FIG. 3, an enlarged view of balloon section 3 of FIG. 2 is shown. The idler 26 and drive 28 pulleys are rotatably affixed between a pair of mounting flanges which extend from the frame 30. In FIG. 3, only one mounting flange 42 is shown for purposes of illustration. The drive assembly 40 includes an adapter tube 44 which is affixed within the hollow 36 between the mounting flange 42 and a gearmotor 46. The drive assembly 40 further includes a guide flange 48 which is affixed to the inner wall 38. The guide flange 48 includes an inner bore 50 for defining a guide flange inner surface 52. The adapter tube 44 is positioned within the inner bore 50 and is rotatably affixed to the guide flange inner surface 52 by a bearing element 54. The bearing element 54 enables rotation of the drive pulley 28 relative to the adapter tube 44 about a center axis 56. In a preferred embodiment, the bearing element 54 is a needle bearing, although it is noted that other types of bearings may be used. The gearmotor 46 includes a power transfer disc 58 which is adapted to rotate about the center axis 56 upon activation of the gearmotor 46. In addition, the power transfer disc 58 is affixed to the inner wall 38. In use, activation of the gearmotor 46 causes rotation of the power transfer disc 58, and thus the drive pulley 28, about the center axis 56. It is noted that other drive assemblies may be used such as those manufactured by the Interroll Corp.

Figure 4:
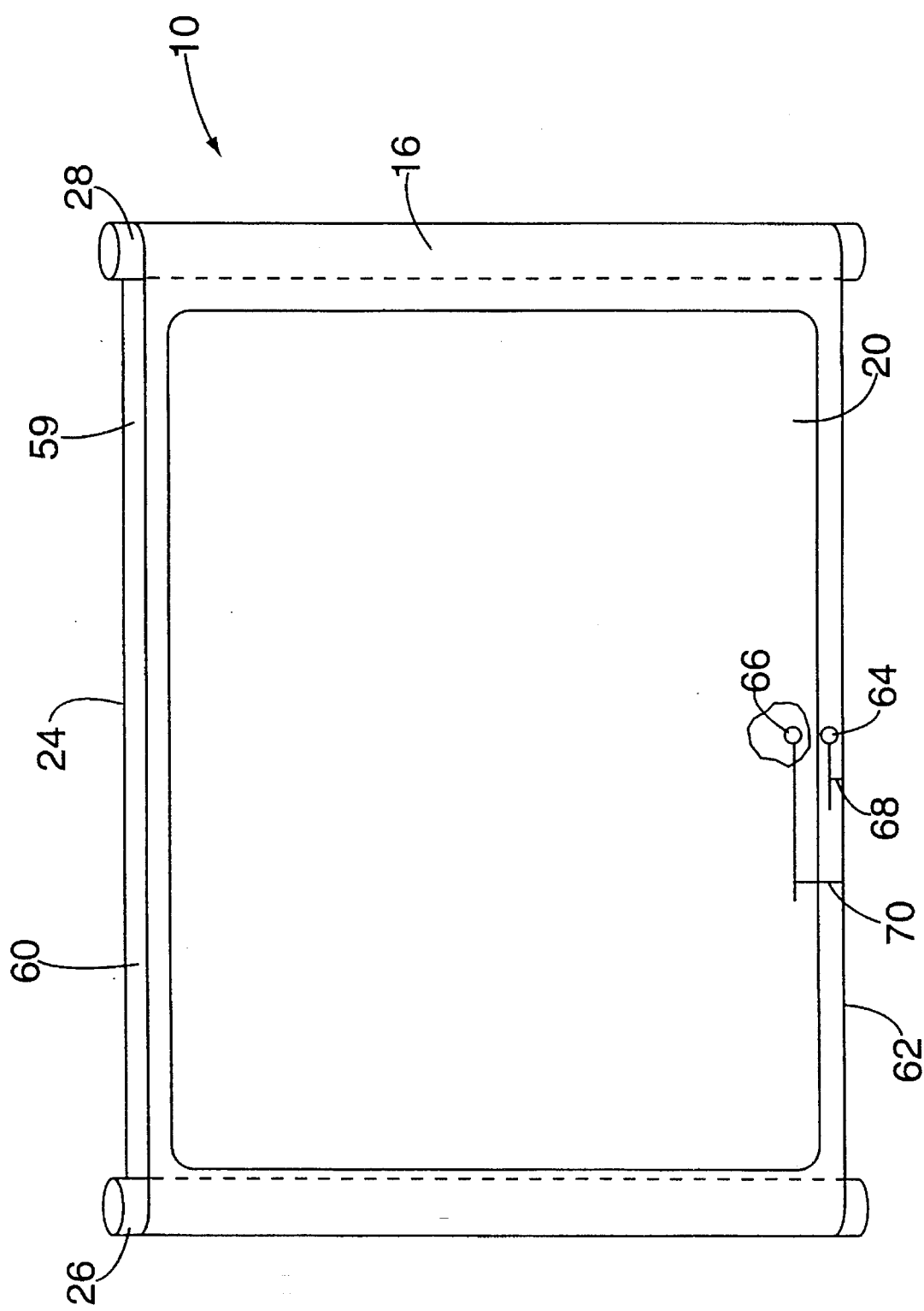
FIG. 4 is a view of the device with the bezel and frame removed.

Referring to FIG. 4, a view of the device 10 with the bezel 14 and frame 30 removed is shown. The belt 16 includes a back surface 59 which is placed in contact around the idler 26 and drive 28 pulleys, thus forming a cavity 60 between adjacent portions of the back surface 59. The idler 26 and drive 28 pulleys are sufficiently spaced apart to create tension in the belt 16. This enables the formation of a frictional force between the drive pulley 28 and the back surface 59 which enables the drive pulley 28 to move the belt. In addition, the belt tension creates a taut viewing surface which is suitable for showing a motion picture. The device 10 further includes a pre-tensioning mechanism (not shown) for adjusting belt tension as desired.

In use, activation of the drive assembly 40 causes the drive pulley 28 to rotate, thus moving the belt 16 and rotating the idler 26 pulley. This enables movement of the belt 16 between the viewing and stored positions. In the viewing position, the screen element 20 faces the passengers whereas the decorative element 24 is positioned such that it faces in an opposite direction. This conceals the decorative element 24 within the bezel 14. Conversely, in the stored position, the decorative element 24 faces the passengers whereas the screen element 20 is positioned such it faces the opposite direction, thus concealing the screen element 20 within the bezel 14.

Figure 5:
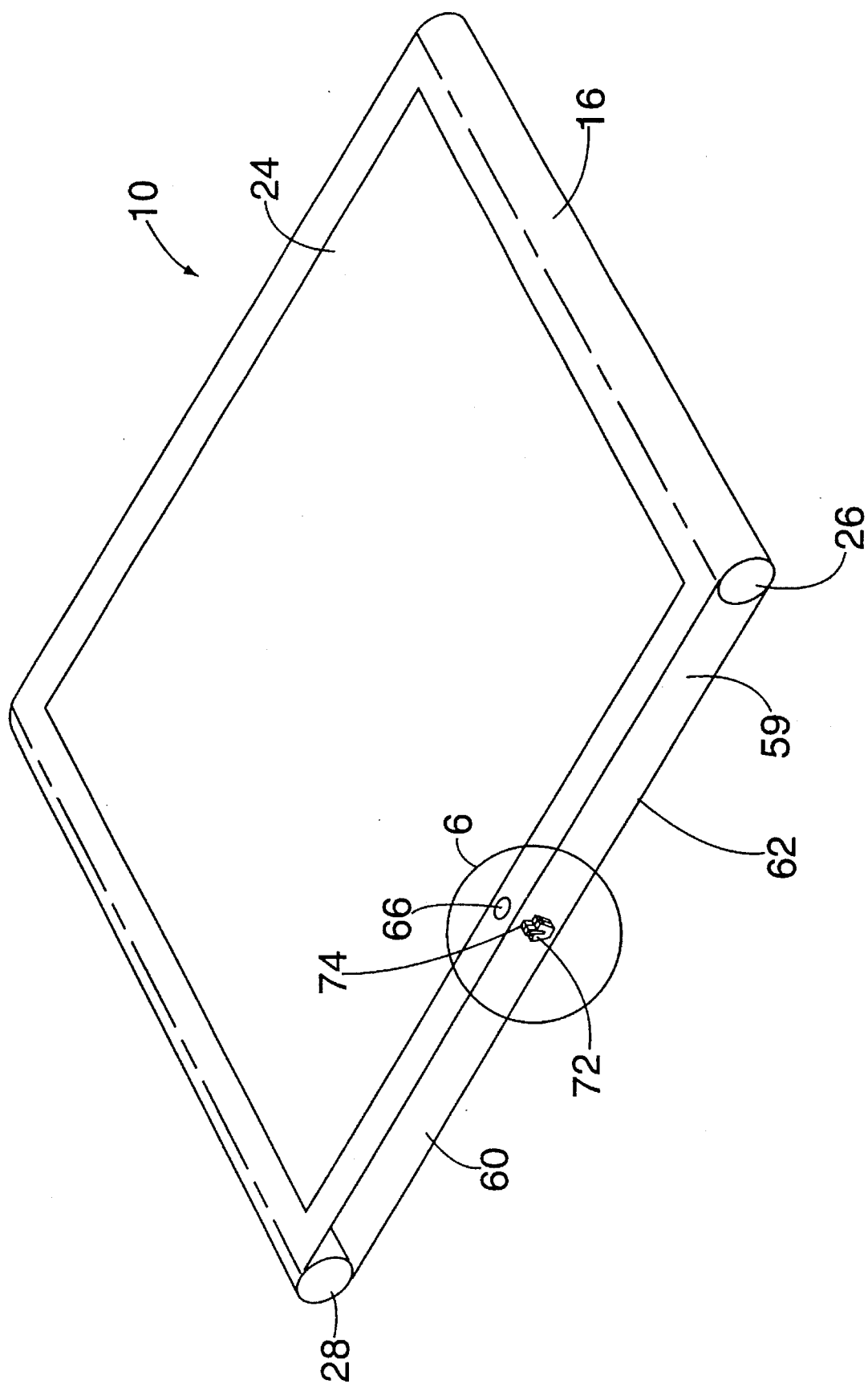
FIG. 5 is a perspective view of a decorative element, bottom edge of the belt, indexing holes and sensors.

The belt 16 further includes a bottom edge 62 and first 64 and second 66 (shown in partial cutaway of the belt 16) indexing holes located adjacent to the screen 20 and decorative elements 24, respectively. The first indexing hole 64 is located a first distance 68 from the bottom edge 62. The second indexing hole 66 is located a second distance 70 from the bottom edge 62 which is greater than the first distance 68. Referring to FIGS. 5 and 6, the device 10 also includes first 72 and second 74 reflective sensors which are located within the cavity 60. FIG. 5 is a perspective view of the decorative element 24 and bottom edge 62 of the belt 16. FIG. 6 in an enlarged view of balloon section 6 of FIG. 5. The first 72 and second 74 sensors are of the type adapted to detect whether or not light generated by the sensor is reflected back to the sensor. Further, the first 72 and second 74 sensors generate a high signal if light is reflected back, and a low signal if light is not reflected back. Such sensors are generally commercially available, such as those manufactured by Honeywell and designated as Model No. HOA1405.

In accordance with the present invention, the first 72 and second 74 sensors are aligned with the travel paths of the first and second indexing holes, respectively. Therefore, in the viewing position, the first indexing hole 64 is moved to a position adjacent to the first sensor 72 and the back surface 59 is moved to a position opposite the second sensor 74 (FIG. 6). As a result, light generated by the first sensor 72 passes through the first indexing hole 64, and thus, is not reflected back to the first sensor 72. This causes the first sensor 72 to generate a low signal. In addition, light generated by the second sensor 74 is reflected from the back surface 59 and back to the second sensor 74, thus causing the generation of a high signal. Conversely, in the stored position, the first indexing hole 64 is moved to a position opposite the back surface 59 and the second indexing hole 66 is moved to a position adjacent to the second sensor 74 (not shown). In this position, light generated by the first sensor 72 is reflected from the back surface 59 and back to the first sensor 72, thus causing the generation of a high signal. In addition, light generated by the second sensor 74 passes through the second indexing hole 66, and thus, is not reflected back to the second sensor 74. This causes the second sensor 74 to generate a low signal.

The first 72 and second 74 sensors are coupled to a logic circuit (not shown) which is adapted to be activated when the aircraft video projection system is activated. The logic circuit is configured to be able to determine the position of the belt 16 in response to the high and low signals generated by the first 72 and second 74 sensors and to activate the drive assembly 40 as required. It is noted that the design of the logic circuit will be readily apparent to one of ordinary skill in the art and need not be described herein. By way of example, if the logic circuit determines that the belt 16 is in the stored position (i.e. decorative element facing passengers) upon activation of the video projection system, the drive assembly 40 is automatically activated so as to move the belt 16 to the viewing position. In addition, if the logic circuit determines that the belt 16 is already in the viewing position, the drive assembly 40 is not activated and the belt 16 remains in the viewing position. If the video projection system is turned off, the logic circuit automatically activates the drive assembly 40 so as to move the belt 16 to the stored position to expose the decorative element 24. Further, if a main power source for the cabin is turned on after being disconnected, the logic circuit automatically activates the drive assembly 40 to move the belt 16 to the stored position regardless of whether the video projection system is turned on or off. In addition, the device 10 includes an override switch and associated circuitry (not shown) which cuts off automatic operation and enables manual operation of the drive assembly 40.

Thus, it is apparent that in accordance with the present invention, a device that fully satisfies the objectives, aims and advantages is set forth above. While the invention has been described in conjunction with specific embodiments, it is evident that many alternatives, modifications, permutations and variations will become apparent to those skilled in the art in light of the foregoing description. This includes use of the device in conjunction with video projection systems in board rooms, conference halls, or for video conferencing. Further, it is noted that the bezel 14 may be used as a control panel for the video projection system. In addition, the bezel 14 may include an infrared receiver for use with a remote commander. In another embodiment, the idler 26 and drive 28 pulleys may be incorporated into the bulkhead wall of the aircraft without using the frame 30. Accordingly, it is intended that the present invention embrace all such alternatives, modifications and variations as fall within the scope of the appended claims.

What is claimed is:

1. A screen for an aircraft video projection system wherein said system generates a projected image, comprising:

first and second rotatable pulleys oriented substantially parallel relative to each other, said first and second pulleys each having a cylindrical shape and said first pulley further including an interior hollow;

a belt having a viewing surface, wherein said belt is positioned in contact around said first and second pulleys and is moveable between a viewing position in which said viewing surface is exposed for display of said projected image and a stored position in which said viewing surface is hidden;

detection means for detecting whether said viewing surface is exposed or hidden; and rotating means for rotating said first pulley to move said belt to said viewing position upon detection that said viewing surface is hidden, wherein said rotating means is affixed within said hollow.

2. The screen according to claim 1, wherein said belt further includes a decorative surface which is exposed when said viewing surface is hidden.

3. The screen according to claim 1, wherein said detection means includes a light sensor.

4. The screen according to claim 3, wherein said belt includes an indexing hole adjacent said viewing surface and said light sensor is adapted to detect said hole.

5. The screen according to claim 1, wherein said rotating means is a gearmotor having a disc for rotating said first pulley.

6. The screen according to claim 1, wherein said belt is fabricated from a heat absorbing material.

7. The screen according to claim 1, wherein said belt is fabricated from a thin metal to enable said belt to further serve as a heat absorbing layer.

8. The screen according to claim 1, wherein said belt is fabricated from stainless steel having a thickness of approximately 0.005 in.

9. The screen according to claim 1, wherein said device further includes a frame for attachment to an aircraft cabin surface and wherein said first and second pulleys are rotatably mounted to said frame.

10. A screen for an aircraft video projection system wherein said system generates a projected image, comprising:

a frame for attachment to an aircraft cabin surface;

first and second pulleys rotatably mounted to said frame and oriented substantially parallel relative to each other, said first and second pulleys each having a cylindrical shape and said first pulley further including an interior hollow for defining an inner wall;

a belt having a viewing surface, wherein said belt is positioned in contact around said first and second pulleys and is moveable between a viewing position in which said viewing surface is exposed for display of said projected image and a stored position in which said viewing surface is hidden;

detection means for detecting whether said viewing surface is exposed or hidden; and a gearmotor having a disc element affixed to said inner wall, said gearmotor being adapted to rotate said disc element and thus said first pulley to move said belt to said viewing position upon detection that said viewing surface is hidden.

11. The screen according to claim 10, wherein said belt further includes a decorative surface which is exposed when said viewing surface is hidden.

12. The screen according to claim 10, wherein said detection means includes a light sensor.

13. The screen according to claim 10, wherein said belt includes an indexing hole adjacent said viewing surface and said light sensor is adapted to detect said hole.

14. The screen according to claim 10, wherein said belt is fabricated from a heat absorbing material.

15. The screen according to claim 10, wherein said belt is fabricated from a thin metal to enable said belt to further serve as a heat absorbing layer.

16. The screen according to claim 10, wherein said belt is fabricated from stainless steel having a thickness of approximately 0.005 in.

17. An aircraft video projection system, comprising:

a frame for attachment to an aircraft cabin surface;

first and second pulleys rotatably mounted to said frame and oriented substantially parallel relative to each other, said first and second pulleys each having a cylindrical shape and said first pulley further including an interior hollow for defining an inner wall;

projection means for generating a projected image;

a belt having a viewing surface and an indexing hole adjacent said viewing surface, wherein said belt is positioned in contact around said first and second pulleys and is moveable between a viewing position in which said viewing surface is exposed for display of said projected image and a stored position in which said viewing surface is hidden, said belt being fabricated from a flexible sheet of thin metal for further use of said belt as a heat absorption layer;

a sensor for detecting said indexing hole, said sensor being located opposite said belt wherein if said hole is opposite said sensor, light generated by said sensor is not reflected back to said sensor thus indicating that said viewing surface is exposed and wherein if said hole is not opposite said sensor, light generated by said sensor is reflected back to said sensor thus indicating that said viewing surface is hidden; and a gearmotor having a disc element affixed to said inner wall, said gearmotor being adapted to rotate said disc element and thus said first pulley to move said belt to said viewing position upon detection that said viewing surface is hidden.

18. The screen according to claim 17, wherein said belt further includes a decorative surface which is exposed when said viewing surface is hidden.

19. The screen according to claim 17, wherein said belt is fabricated from stainless steel having a thickness of approximately 0.005 in.

* * * * *